(12) United States Patent
Onorato et al.

(10) Patent No.: US 8,667,080 B2
(45) Date of Patent: Mar. 4, 2014

(54) COMPUTER-IMPLEMENTED METHOD, A COMPUTER PROGRAM PRODUCT AND AN EMBEDDED SYSTEM FOR INCREASING THE SPEED OF DATA RETRIEVAL BY A CLIENT ON THE EMBEDDED SYSTEM

(75) Inventors: Orlando Onorato, Rome (IT); Flavio Console, Rome (IT); Claudia Caldera, Rome (IT); Giovanni Gagliardi, Rome (IT); Giovanni Persia, Rome (IT); Aurelio Nocerino, Rome (IT)

(73) Assignee: Accenture Global Services Limited, Dublin (IE)

( * ) Notice: Subject to any disclaimer, the term of this patent is extended or adjusted under 35 U.S.C. 154(b) by 272 days.

(21) Appl. No.: 13/191,759

(22) Filed: Jul. 27, 2011

(65) Prior Publication Data

US 2012/0030309 A1 Feb. 2, 2012

(30) Foreign Application Priority Data

Jul. 29, 2010 (EP) .................................... 10425263

(51) Int. Cl.
*G06F 15/16* (2006.01)
(52) U.S. Cl.
USPC ......................................................... 709/217
(58) Field of Classification Search
USPC ......................................................... 709/217
See application file for complete search history.

(56) References Cited

U.S. PATENT DOCUMENTS

| 6,421,733 B1* | 7/2002 | Tso et al. ...................... 709/246 |
| 2007/0022328 A1* | 1/2007 | Tarra et al. ..................... 714/100 |
| 2007/0121856 A1* | 5/2007 | Alperin et al. ........... 379/142.12 |

FOREIGN PATENT DOCUMENTS

EP 1701508 A1 9/2006

OTHER PUBLICATIONS

Klemm R. P. "WebCompanion: a friendly client-side Web prefetching agent", IEEE Transactions on Knowledge and Data Engineering, IEEE Service Center, Los Alamitos, CA, US. vol. 11, No. 4, Jul. 1, 1999, pp. 577-594, XP002404939, ISSN: 1041-4347, DOI: DOI:10.1109/69.790809 *figure 1* *p. 578—right-hand column* *p. 580—right-hand column*.

Wang J. "A Survey of Web Caching Schemes for the Internet", Computer Communication Review, ACM, New York, NY, US, vol. 29, No. 5, Oct. 1, 1999, pp. 36-46, ISSN: 0146-4833, DOI: DOI: 10.1145/505696.505701 *paragraph [4.10]*.

* cited by examiner

*Primary Examiner* — David X Yi
(74) *Attorney, Agent, or Firm* — Mannava & Kang, P.C.

(57) ABSTRACT

The present description refers in particular to a computer-implemented method, a computer program product, and an embedded system for increasing the speed of data retrieval by a client on the embedded system. The embedded system executes a client and an intermediary, wherein the client and the intermediary are executed separately, and wherein the intermediary manages the storing component. A request may be received from the client at the intermediary, for a first content element of a document. The intermediary determines whether the first content element is stored in a storing component and when the first content element is stored in the storing component: retrieves the first content element from the storing component; and sends the first content element from the intermediary to the client.

13 Claims, 4 Drawing Sheets

COMPUTER-IMPLEMENTED METHOD, A COMPUTER PROGRAM PRODUCT AND AN EMBEDDED SYSTEM FOR INCREASING THE SPEED OF DATA RETRIEVAL BY A CLIENT ON THE EMBEDDED SYSTEM

PRIORITY

This application claims foreign priority to European patent application serial number 10 425 263.0, filed on Jul. 29, 2010, and entitled "A Computer-Implemented Method, A Computer Program Product and an Embedded System for Increasing the Speed of Data Retrieval by a Client on the Embedded System", which is incorporated by reference in its entirety.

SUMMARY

The present application relates to a computer-implemented method, a computer program product and an embedded system for increasing the speed of data retrieval by a client on the embedded system.

According to an aspect, a computer-implemented method for increasing the speed of data retrieval by a client on an embedded system is provided. The embedded system may comprise a storing component. The method may comprise executing the client on the embedded system. The method may further comprise executing an intermediary on the embedded system, wherein the client and the intermediary are executed separately, and wherein the intermediary manages the storing component. The method may further comprise receiving a request, from the client at the intermediary, for a first content element of a document. Moreover, the method may comprise determining, by the intermediary, whether the first content element is stored in the storing component. When the first content element is stored in the storing component, the method may further comprise retrieving the first content element from the storing component, and sending the first content element from the intermediary to the client.

In some cases, when the first content element is not stored in the storing component, the method further comprises retrieving the first content element from a server, and determining, by the intermediary, whether to store the first content element in the storing component based on a storing rule.

Moreover, the storing rule may include at least one the following: an expiration,
a string of a Uniform Resource Locator, and a content type.

Also, the embedded system may include a non-volatile memory. A firmware may be stored in the non-volatile memory as a binary image.

Furthermore, the storing component may be stored separately from the firmware.

In some embodiments, executing the client on the embedded system may further comprise copying the firmware from the non-volatile memory to a volatile memory. Copying the firmware to the volatile memory may comprise copying the entire contents of the non-volatile memory into the volatile memory.

In addition, the client and the intermediary may be executed as separate processes.

Moreover, the document may include a second content element. The first content element may be infrequently modified. Furthermore, the second content element may be frequently modified. Accordingly, the method may further comprise storing the first content element in the storing component. Also, the method may further comprise determining not to store the second content element in the storing component.

In some cases, the embedded system is a set-top box. Also, the server may include software for delivering Internet Protocol Television. The software may be referred to as IPTV middleware.

The client may include a web browser.

In addition, the intermediary may be implemented as an external component of the client. More specifically, the intermediary may be implemented as a plugin of the client.

According to another aspect, a computer program product comprising computer-readable instructions is provided. The computer readable instructions, when loaded and executed on an embedded system, cause the system to perform operations according to the method described above.

According to yet another aspect, an embedded system is provided. The embedded system may comprise a client. The embedded system may further comprise a storing component operable to store data. The embedded system may also comprise an intermediary. The intermediary may be operable to manage the storing component. The intermediary may be further operable to receive a request, from the client, for a first content element of a document. The intermediary may also be operable to determine whether the first content element is in the storing component. When the first content element is in the storing component, the intermediary may be further operable to retrieve the first content element from the storing component, and send the first content element to the client. The client and the intermediary may be operable to be executed separately.

TECHNICAL DEFINITIONS

An "embedded system" may be understood as a computer system or a device designed to perform one or a few dedicated functions. The embedded system may be contrasted with a general purpose computer system, e.g. a desktop PC.

A "set-top box" (STB), also known as a digibox, a set-top unit or an integrated receiver/decoder (IRD), is an example of the embedded system. The STB may be operable to connect to a display device (e.g. a television or a computer) and an external signal source (e.g. a content server). The STB may be operable to convert a signal received from the external signal source into content which is then displayed on the display device.

An "integrated circuit" (also known as a microcircuit, microchip, or chip) may refer to a miniaturized electronic circuit that has been manufactured in the surface of a thin substrate of semiconductor material.

A "digital signal processor" (DSP) may be understood as a specialized microprocessor optimized for certain operations, possibly including the processing (e.g. conversion) of signals. In comparison to a general purpose microprocessor, a DSP may have reduced hardware complexity, reduced functionality, lower cost, better performance, and reduced power consumption.

A "system on a chip" (SoC) may refer to the integration of the storing components of a computer system on a single integrated circuit. Extra memory and/or peripherals may be needed in order for the SoC to achieve full functionality. The SoC may include the DSP.

A "Digital Media Processor" (DMP), also referred to as a media processor, may be understood as an SoC which is designed to process a stream of data (e.g. media such as video or audio) in real time (or near real time). The DMP may include one or more of the following: a DSP, a memory interface, a media interface, and an audio/video accelerator. The DMP may be capable of decoding, transcoding (converting from one format to another), encoding, and transrating (scaling from a higher to a lower bit rate) various types of media (e.g. images) and media streams.

A "string" may be understood as a finite sequence of characters, where each character is a unit of information such as a symbol. "Text" may include one or more strings.

A "cache" may refer to a storing component that stores data so that future requests for the data can be served faster.

"Mobile code" may refer to software transferred between systems, possibly executed on a local system without an explicit trigger for installation or execution by the recipient. Examples of mobile code include JavaScript, VBScript, Java applets, and ActiveX controls.

"Internet Protocol television" (IPTV) may be understood as a system through which digital television service is delivered using the architecture and network methods of the Internet Protocol (IP) suite over a packet switched network infrastructure. IPTV may be delivered using an STB.

A "proxy" may refer to software that acts as an intermediary for requests from a client seeking resources (e.g. a file or a web page).

"Static" content elements (also referred to as static contents) may refer to content elements that are modified infrequently. For example, static content elements may be modified less than once per month, less than once every two months, less than once per year, or even less frequently.

"Dynamic" content elements (also referred to as dynamic contents) may refer to content elements that are modified frequently. For example, dynamic content elements may be modified more than once per month, more than twice per month, more than once per week, or even more frequently. In general, dynamic content elements are modified more frequently than static content elements.

Dynamic content elements may be generated using server logic. Examples of server logic that can be used to generate dynamic content elements are Common Gateway Interface (CGI), PHP: Hypertext Preprocessor (PHP), JavaServer Pages (JSP), and Active Server Pages (ASP).

A "process" may be understood as an instance of an executing program. The process may include current values of the program counter (containing the memory address of the next instruction to be fetched), register values and variables. The process may manage a set of resources and have its own address space, as well as signal handlers and accounting information.

A "thread" is also referred to as a thread of control, a thread of execution, a miniprocess or a lightweight process. Multiple threads may exist within a process. The thread may share an address space and other resources of the process with other threads. Each thread generally has its own program counter, register values, a stack (including input parameters, local variables and temporary variables) and state.

A "fiber" can be created by allocating a stack and a data structure for storing register values and data associated with the fiber. A fiber may be understood as similar to a thread. Switching between threads may require entering and exiting the operating system (OS) kernel. However, fibers may be cooperatively scheduled, and the operating system kernel has no knowledge of fibers.

A "plugin" may be understood as a module or application used to realize a specific function or to increase the performance of an existing function. This may be achieved by implementing the plugin in a low level programming language (i.e. relatively close to machine level) such as C.

Processes, threads and fibers may be further understood with reference to *Operating Systems* by Andrew S. Tanenbaum, $3^{rd}$ ed., 2009.

DETAILED DESCRIPTION

In the following text, a detailed description of examples will be given with reference to the drawings. It should be understood that various modifications to the examples may be made. In particular, elements of one example may be combined and used in other examples to form new examples.

The subject matter described in this specification can be implemented as a method or on a device, possibly in the form of one or more computer program products. The subject matter described in the specification can be implemented in a data signal or on a machine readable medium, where the medium is embodied in one or more information carriers, such as a semiconductor memory, or a hard disk. Such computer program products may cause a data processing apparatus to perform one or more operations described in the specification.

In addition, subject matter described in the specification can also be implemented as a system including a processor, and a memory coupled to the processor. The memory may encode one or more programs to cause the processor to perform one or more of the methods described in the specification. Further subject matter described in the specification can be implemented using various machines.

Details of one or more implementations are set forth in the exemplary drawings and description below. Other features will be apparent from the description, the drawings, and from the claims.

Figure 1:
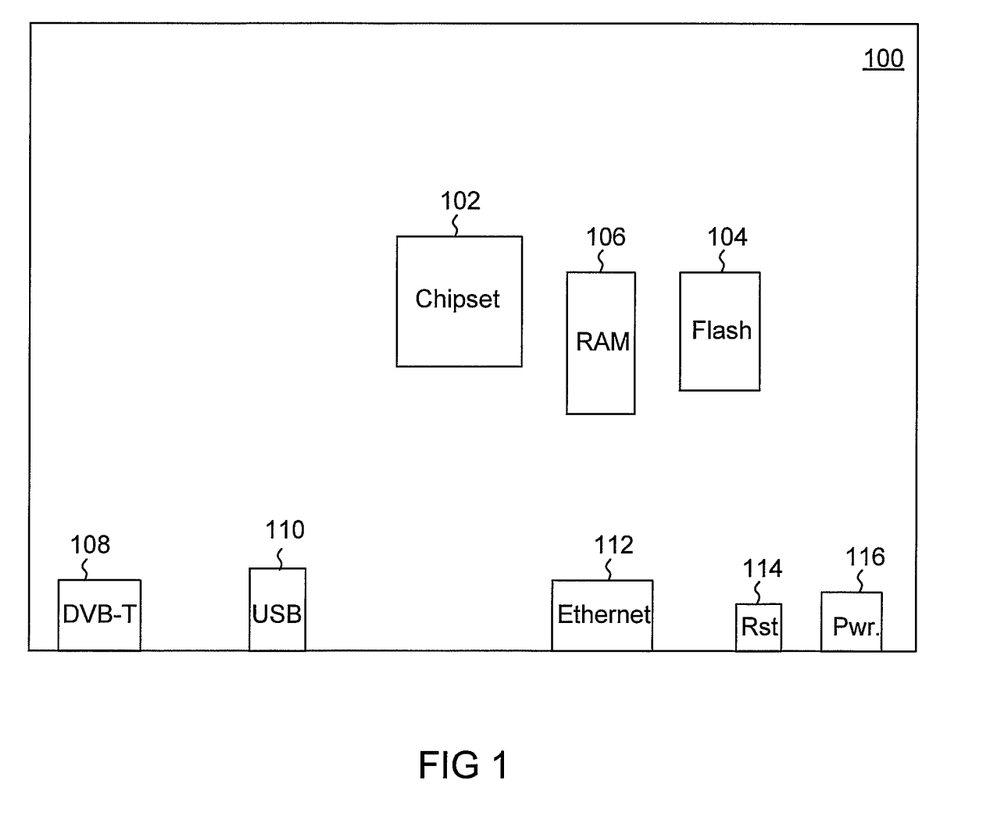
FIG. 1 shows a block diagram of an embedded system.

FIG. 1 shows a block diagram of an embedded system 100, including a chipset 102. In a specific example, the chipset 102 may be an SoC, such as a 32 bit MIPS 4KeC including audio/video hardware accelerators. In another example, the chipset 102 may be a DMP, such as the Texas Instruments TMS320DM6446 including an Advanced RISC Architecture Machine (ARM) ARM926EJ-S CPU (RISC refers to Reduced Instruction Set Computer). The chipset 102 may be a microprocessor or a microcontroller. Other implementations are also possible.

Some implementations of the embedded system 100 include a first non-volatile memory, such as a flash memory 104. Alternatively, the embedded system 100 may include another form of non-volatile memory. The first non-volatile memory of the embedded system 100 may be electronically addressable. In some cases, the first non-volatile memory of the embedded system 100 may be another form of solid-state memory, such as a Silicon-Oxide-Nitride-Oxide-Silicon (SONOS) memory, or a non-volatile Random Access Memory. Other types of non-volatile memory are also possible.

The flash memory 104 may be fixed to the embedded system 100. In particular, the flash memory 104 may be built into a chip and the chip may be wired to the embedded system 100. The contents of the flash memory 104 may be referred to as firmware.

Figure 2:
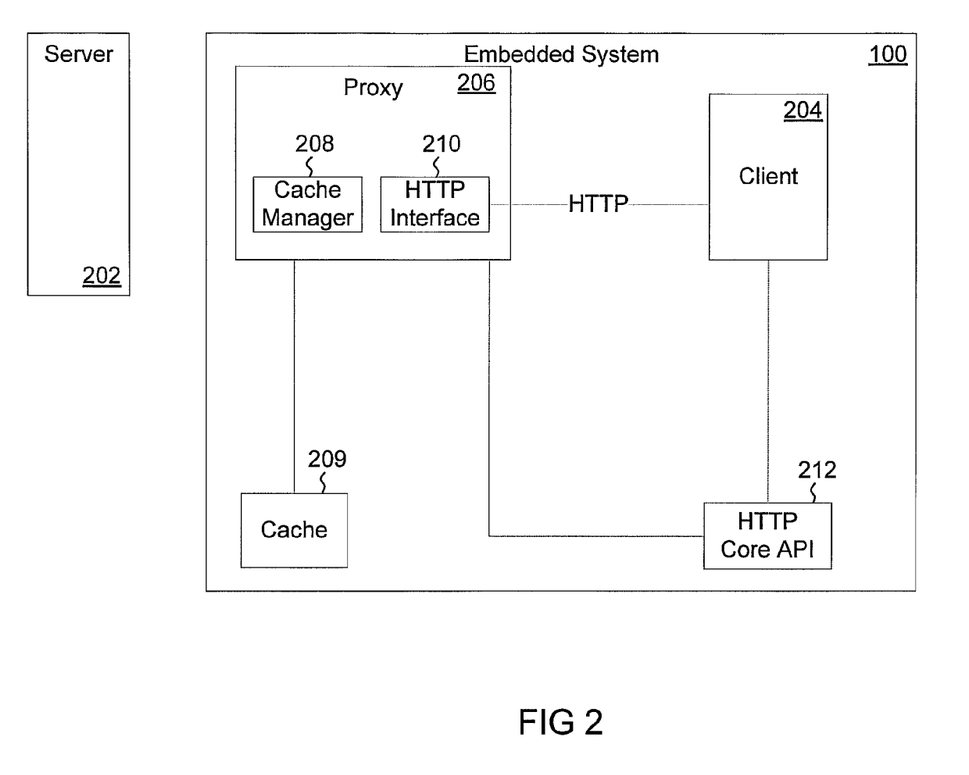
FIG. 2 shows a diagram of the embedded system and a server.

In some cases, the firmware stored by the flash memory 104 may include an operating system, e.g. Linux with kernel version 2.6, for the embedded system 100. The firmware may also include a client (e.g. as depicted in FIG. 2), and basic user interface components that can be used to build a user interface (see FIG. 3) even if the client is not connected to a server (e.g. as depicted in FIG. 2).

According to one example, the embedded system 100 may include a second non-volatile memory (not depicted). The second non-volatile memory may be implemented as a hard drive, e.g. a Universal Serial Bus (USB) hard drive.

The embedded system 100 may include minimal hardware, e.g. hardware required to execute basic networking tasks and no other hardware, in order to lower costs. Accordingly, programs on the embedded system 100, e.g. the client and the proxy depicted in FIG. 2, may be implemented in a low level programming language such as C for performance reasons. In this context, "low level" may be understood to refer to a programming language that requires more knowledge of underlying hardware and (generally) more coding hours than a higher level programming language (e.g. Java). Moreover, it may be difficult to recover from errors in a particular program on the embedded system 100. For example, memory leaks may have a particularly heavy impact on the embedded system 100 due to the limited capacity of the RAM 106. Therefore, extensive debugging and testing of programs deployed on the embedded system 100 may be necessary. Thus, programs that might be relatively easy to develop on a general purpose computer may be difficult to develop for the embedded system 100.

The embedded system 100 may be implemented as an STB or as a mobile device. For example, the embedded system 100 may be implemented on a smart phone or a mobile computer with Linux OS or Android OS. Specifically, the embedded system 100 may be implemented as a Nokia N900, an OpenMoko Neo Free Runner, an HTC Hero or a Motorola Droid. Other implementations are also possible.

Moreover, the contents of the flash memory 104 (e.g. operating system and applications) may be stored on the embedded system 100 in a monolithic approach, i.e. as a single closed block. For example, the contents of the flash memory 104 may be stored as a binary image or as a compressed binary image. In other words, the flash memory 104 may contain a binary firmware image or a compressed binary firmware image. This may reduce the amount of flash memory required on the embedded system 100, and thus reduce the cost of producing the embedded system 100.

In addition, the use of the binary image on the embedded system 100 may be advantageous for a manufacturer or maintainer of the embedded system 100. For example, use of the binary image may make it simpler for a user to update the embedded system 100.

The binary firmware image may contain the complete contents and structure representing a storage medium, e.g. the flash memory 104. The binary image may be stored in a single file. According to a conventional technique, the contents of the firmware may include static content elements. The storage of static content elements in the firmware may be easy and simple to implement. Moreover, this technique may allow static content elements to be updated and manipulated without requiring a software component (e.g. the proxy depicted in FIG. 2) to manage the static content elements.

Examples of static content elements include elements of the native GUI of the embedded system 100. In other words, it is possible that static content elements are not associated with a particular application However, storing static content elements in the flash memory 104 as part of the binary firmware image may have the effect that the only way to update the static content elements is to perform a full firmware upgrade.

It may be difficult or undesirable to perform the full firmware upgrade in order to replace content elements, e.g. static content elements, stored in the firmware of the embedded system 100. The full firmware upgrade may result in the use of more bandwidth, possible errors may have more severe consequences, and the full firmware upgrade may disrupt operations of the embedded system 100. For example, downloading the full firmware in order to update one or more static content elements may require more bandwidth than only downloading the static content elements to be updated. Furthermore, it is possible that the full firmware upgrade can fail, causing the embedded system 100 to become unusable. Also, the full firmware upgrade often causes an interruption of operation of the embedded system 100, since reboot of the embedded system 100 is normally required.

The embedded system 100 may further include a volatile memory, such as random access memory (RAM) 106. Furthermore, the embedded system 100 may include a Digital Video Broadcasting-Terrestrial (DVB-T) interface 108.

Also, the embedded system 100 may include an interface, such as a USB port 110. The USB port 110 may be operable to connect USB devices to the embedded system 100.

The embedded system 100 may also include a means of access connectable to an external network, such as an Ethernet port 112. The embedded system 100 may also support wireless access, e.g. by means of wireless fidelity (WiFi). The external network may provide access to an external signal source.

In addition, the embedded system 100 may include a reset button 114 that can be used to return the embedded system 100 to a standard or default configuration. The embedded system 100 may further include a power connector 116 that can be used to connect the embedded system 100 to a power source.

FIG. 2 shows a second block diagram of the embedded system 100 that is consistent with some embodiments. The second block diagram also shows a server 202.

The server 202 may be capable of sending a signal, such as an IPTV signal, to a client 204. The server 202 may include an IPTV middleware, i.e. software packages associated with delivering an IPTV service.

It may be possible to execute the client 204 on the embedded system 100. The client 204 may be implemented as a web browser (e.g. Microsoft Internet Explorer, Mozilla Firefox, Opera, Fresco), a custom-made graphical user interface, or some other form of user interface. The client 204 may be stored in the firmware of the flash memory 104. The client 204 may be capable of displaying documents, e.g. web pages. The documents may be made up of content elements. Examples of content elements are images in various formats, e.g. Joint Photographic Experts Group (JPG), Graphics Interchange Format (GIF), Portable Network Graphics (PNG), and markup language text, e.g. Hypertext Markup Language (HTML), Extensible Markup Language (XML). Content elements may also include presentation semantics, such as cascading style sheets (CSS), and mobile code, e.g. JavaScript.

The client 204 may be operable to display images and markup language text according to the presentation semantics. The client 204 may also be capable of executing the mobile code.

In addition, the client 204 can be configured to run various applications. For example, the client 204 can be configured to execute a video on demand catalog, which enables a user to browse categories of videos, select a video for viewing and retrieve information about the video. The client 204 may also execute an electronic program guide. The electronic program guide enables a user to browse television channels, view a schedule of programs for each channel and retrieve information about TV programs (e.g. start time, end time, description).

In some cases, in order to minimize costs, the embedded system 100 is manufactured with limited resources. For example, the embedded system 100 may include a 300 MHz CPU, 128 MB RAM, and 32 MB flash. Moreover, it may not be feasible to use modern software to provide a user interface on the embedded system. Accordingly, the client 204 of the embedded system may be implemented using a web browser that is 4 to 10 years old and does not include certain functionality. For example, the client 204 of the embedded system may not support Java applets or ActiveX controls.

Furthermore, it may be possible to execute an intermediary on the embedded system 100. The intermediary may be implemented as a proxy 206. The proxy 206 may be executed separately from the client 204. Implementing the proxy 206 as an external component may have the advantage that it is not necessary to integrate the proxy 206 with the client 204.

In some embodiments, the proxy 206 may be implemented as an external component of the client 204. For example, the client 204 may be implemented as a browser and the proxy 206 may be implemented as a browser plugin. In this case, the proxy 206 operates within the memory space of the client 204. Thus, the proxy 206 may communicate with the client 204 using function calls rather than HTTP. Communication using function calls may have the effect of improving performance.

Alternatively, the client 204 and the proxy 206 are executed as separate processes. In this context, a process may be understood as an instance of executing program. For example, the client 204 is a first executing program and the proxy 206 is a second executing program. The client 204 and the proxy 206 can also be executed as mini processes, e.g. threads or fibers.

Thus, executing the intermediary separately from the client 204 may be achieved by implementing the proxy 206 as an external component of the client 204, or by implementing the proxy 206 as a separate process. Other implementations are also possible.

The proxy 206 may include a management component. The management component may be capable of managing a storing component. In some cases, the management component is implemented as a cache manager 208. The storing component may be implemented as a cache 209. The size of the cache 209 may be limited due to limited resources of the embedded system 100. The client 204 may interact with the proxy 206 in order to access data in the cache 209. Although the cache 209 is depicted separately from the proxy 206, the cache 209 may be included as part of the proxy 206.

The proxy 206 may also include an interface, such as a Hypertext Transfer Protocol (HTTP) interface 210. The client 204 may communicate with the proxy 206 using the HTTP interface 210. Adding the proxy 206 to the embedded system 100 may have the effect of enhancing the performance of the embedded system 100. For example, bandwidth requirements between the embedded system 100 and the server 202 may be reduced.

The proxy 206 may use a signaling mechanism in order to manage and generate events. The events may be used by other applications. For example, the proxy 206 may generate an event when a preset maximum cache size is reached, i.e. when a filesystem usage limit has been reached. The proxy 206 may also generate an event when CPU utilization reaches a preset threshold, e.g. due to execution of an operation.

The embedded system 100 may also include an HTTP core application programming interface (API) 212. The client 204 and the proxy 206 may use the HTTP core API 212 to communicate with the server 202. For example, the client 204 may communicate with the server 202 in order to select an IPTV program to watch.

In some cases, the client 204 may communicate with the proxy 206 and the proxy 206 communicates with the server using the HTTP Core API 212. In other cases, the client 204 may interact with the HTTP core API 212 in order to communicate with the server directly.

Figure 3:
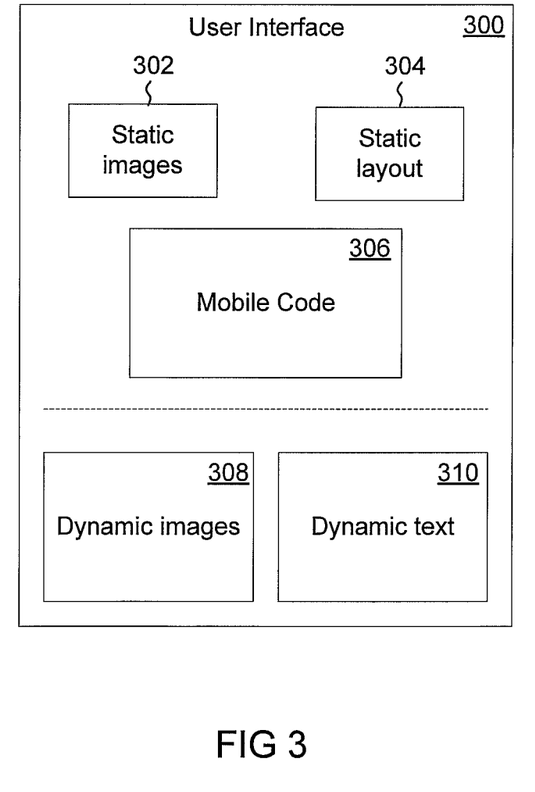
FIG. 3 shows a block diagram of a user interface.

FIG. 3 shows a block diagram of a user interface 300 consistent with some embodiments of the present invention.

The client 204 may be capable of displaying the user interface 300. The user interface 300 may include static images 302, e.g. a background image in JPG format. Also, the user interface 300 may include static layout 304 in the form of presentation semantics. In particular, the static layout 304 may determine a style and a position of static and dynamic content elements in the user interface 300.

In addition, the user interface 300 may include mobile code 306. For example, the mobile code 306 may be embedded in a document downloaded from the server 202 to the client 204, and may be executed by the client 204.

The static images 302, the static layout 304, and the mobile code 306 may be understood as static content elements that are infrequently modified. According to conventional techniques, the static content elements may be stored in the firmware with the client 204. Storing the static content elements in the firmware may be simple and easy to implement. Moreover, according to conventional techniques, the proxy 206 is not required to be executed on the embedded system 100. It may be particularly difficult and time consuming to write programs (e.g. the proxy 206) for the embedded system 100 since the embedded system 100 may require programs to be particularly stable and efficient (particularly in comparison to programs on a general purpose computer). Thus, programs for the embedded system 100 may require extensive testing and debugging, as well as the use of a low level programming language such as C or assembly language.

However, in accordance with some embodiments of the invention, the cache 209 may be stored separately from the firmware, i.e. not in the flash memory 104. For example, the cache 209 may be stored in the second non-volatile memory, separate from the flash memory 104. Storing the cache 209 in a non-volatile memory could be advantageous since the contents of the cache 209 would be available after disconnecting the power connector 116 from the power source.

Content elements, e.g. static content elements, may be stored in the cache 209. Storing content elements in the cache 209, i.e. separate from the firmware, leads to the technical effect that the content elements can be updated without performing the full firmware upgrade.

A conventional embedded system interacts with a conventional server in order to download content elements, e.g. static content elements, and store the downloaded content elements in a volatile memory. However, this may lead to failure of the conventional server in certain situations, e.g. when many embedded systems start up and attempt to download content elements at the same time. For example, such a failure (also referred to as a chain reaction failure) could occur in the case of an upgrade of many embedded systems or in the case of a power outage affecting many embedded systems.

Storing the content elements in the cache 209, where the cache 209 is stored in the non-volatile memory (e.g. the second non-volatile memory) of the embedded system 100, leads to the technical effect that some or all failures due to many embedded systems starting up at the same time (i.e. chain reaction failures) can be avoided. For example, if there is a power outage that causes the embedded system 100 to restart, the client 204 may be able to retrieve substantial portions of the user interface 300 (e.g. static content elements) by means of the proxy 206. Similarly, other embedded systems configured according to the present application may be able to retrieve static content elements from corresponding proxies. The reduction in HTTP requests to the server 202 resulting from the retrieval of static content elements from proxies may prevent the server 202 from failing.

Also, use of the proxy 206 may reduce the data the server 202 is required to transmit, thereby reducing the load on the server 202. Moreover, use of the proxy 206 may result in a reduced boot time for the embedded system 100 and a faster display of the user interface 300.

Dynamic images 308 may also be part of user interface 300. Furthermore, the user interface 300 may include dynamic text 310. Dynamic images 308 and dynamic text 310 may be understood as dynamic content elements. Examples of dynamic images in the context of a video on demand catalog application are film titles and film posters, where a film poster is a visual advertisement of a movie that may illustrate a scene from the movie. Examples of dynamic text, also in the context of a video on demand catalog application, are a description of a film and a cast of a film.

Determining whether a specific content element is a dynamic content element or a static content element may be based on an analysis of how often the specific content element has been modified over a time interval. A storing rule (e.g. a filter) may be created if the specific content element is determined to be a static content element. The storing rule may be based on a type of the specific content element and/or a URL of an HTTP request. Content types may refer to the composition of a user interface on the embedded system 100. Exemplary content types include JPEG images (image/jpeg), gif images (image/gif), html pages (text/html), cascading style sheets (text/css), and javascript code (application/javascript).

The storing rule may also include an expiration, i.e. an indication as to how long the specific content element will be stored. Storing rules may be maintained and implemented by the cache manager 208.

Figure 4:
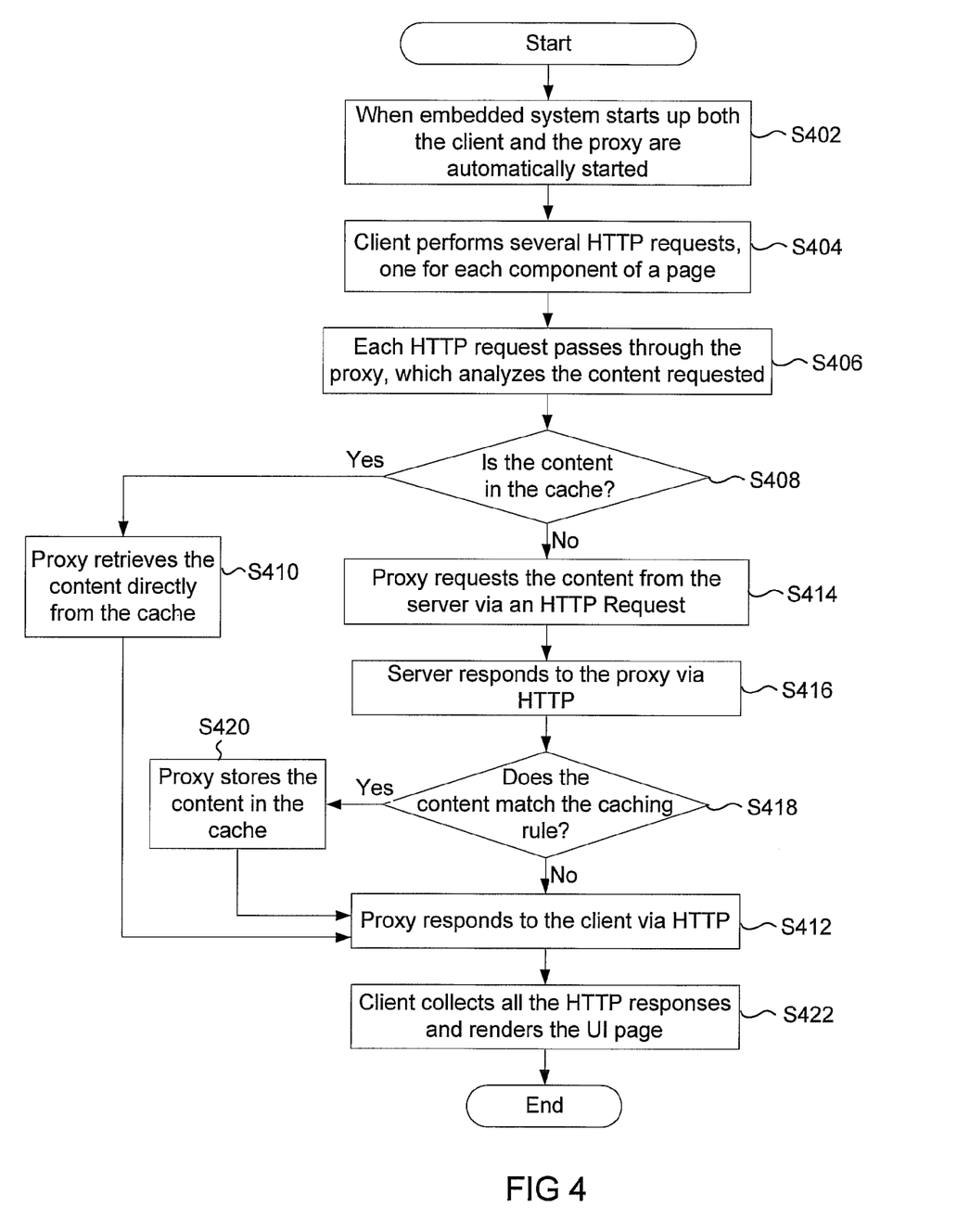
FIG. 4 shows a flowchart of an exemplary method for increasing the speed of data retrieval by a client on an embedded system.

FIG. 4 shows a flowchart of an exemplary method for increasing the speed of data retrieval by the client 204 on the embedded system 100.

According to the method depicted, the client 204 and the proxy 206 are executed on the embedded system 100 at step S402. For example, the client 204 and the proxy 206 can be executed automatically. Furthermore, the client 204 and the proxy 206 may be executed separately, e.g. as separate processes.

Although steps S404 to S422 refer to HTTP requests, the use of other protocols is also possible, e.g. file transfer protocol or real time streaming protocol. Minor changes to the method described may be necessary in order to use the other protocols.

At step S404, the client 204 may request a first content element of a document (also referred to as a component of a page). For example, the document may be requested in response to user input and the request may be processed beginning with the first content element of the document. The first content element may be one of multiple content elements in the document. Alternatively, the first content element may be the only content element in the document. According to some embodiments of the present invention, the document contains multiple content elements and the client 204 performs an HTTP request for each content element. The HTTP requests may occur in series or in parallel.

Moreover, at step S406, the client 204 sends a request for the first content element of the document to the proxy 206. For example, the client 204 sends each HTTP request described in step S404 to the HTTP interface 210. The proxy 206 may analyze (e.g. parse) each HTTP request.

At step S408, the proxy 206 may determine whether the content element identified in an HTTP request sent in step S406 is stored in the cache 209. For example, the HTTP request may identify the first content element. In some cases, a content element is stored in the cache 209 when the content element is received.

Step S410 and step S414 are two alternatives that can be taken depending on the outcome of step S408. When the first content element is stored in the cache 209, step S410 can be carried out. When the first content element is not stored in the cache 209, then step S414 can be carried out. When step S414 is carried out, steps S416, S418, and optionally, step S420, can also be performed.

Accordingly, when the first content element is stored in the cache 209, the proxy 206 may retrieve the first content element from the cache 209 at step S410. Subsequently, the proxy 206 may send the first content element to the client 204 at step S412.

Alternatively, when the first content element is not stored in the cache 209, the proxy 206 may request the first content element from the server 202 at step S414. For example, the proxy 206 may make an HTTP request to the server 202. The server 202 may respond to the proxy 206 at step S416. At step S418, a determination is made as to whether the first content element matches at least one storing rule. In other words, step S418 involves determining whether to store the first content element based on the storing rule. A caching rule is an example of the storing rule.

Either step S420 or step S412 may be performed after step S418, depending on the outcome of step S418. For example, when the first content element matches the storing rule, the first content element may be stored in the cache 209 at step S420. When the first content element does not match the storing rule, step S412 may be carried out after step S418.

According to a specific example, an exemplary HTTP request made at step S406 could include the following uniform resource locator (URL): "http://iptv-provider/GUI/images/background.png.".

For example, storing rule A is as follows:

```
<rule>
<filter>/GUI/images</filter>
<expiration>43200</expiration>
</rule>
```

According to storing rule A, if the HTTP request includes a URL with the string "/GUI/images", such as the URL of the exemplary HTTP request above, the proxy 206 may do the following:

include the URL in a request to the server 202,
receive a response from the server 202, and
store a content element of the server's response in the cache 209.

Also, according to storing rule A, the content element (e.g. the background.png image referred to by the URL) may be stored in the cache 209 for 43,200 minutes (30 days). In other words, the content element has an expiration time of 43,200 minutes. If the client 204 requests the same URL in the future, the proxy 206 retrieves the background.png image from the cache 209.

In a further example, storing rule B is as follows.

```
<rule>
<content-type-filter>image/jpeg</content-type-filter >
<expiration>43200</expiration>
</rule>
```

Similar to storing rule A, according to storing rule B, if the HTTP request includes a content-type field specifying "image/jpeg", the proxy 206 may do the following:
include a URL of the HTTP request in a request to the server 202,
receive a response from the server 202, and
store a content element of the server's response in the cache 209.

In another example, storing rule C is as follows:

```
<or-condition>
<rule>
<content-type-filter>image/jpeg</content-type-filter >
<expiration>43200</expiration>
</rule>
<rule>
<content-type-filter>image/gif</content-type-filter >
<expiration>43200</expiration>
</rule>
</or-condition>
```

Storing rule C includes an OR expression, such that there rule matches if the content element is a JPEG image or a GIF image.

In a rule defined using an OR expression, the entire rule matches if at least one sub-rule inside the OR rule matches. Moreover, if a rule is defined using an AND expression, the entire rule matches if all the sub-rules inside the AND expression match. In some cases (e.g. storing rule C), each sub-rule is defined using the <rule> </rule> tags. Other logical expressions (e.g. XOR) are also possible.

Thus, in some cases, when the one or more filter expression(s) of a storing rule match an HTTP request, the one or more content element(s) of the HTTP request are stored according to the expiration time.

Different storing rules can be implemented for different content elements depending upon expiration policies associated with content elements. In some cases, storing rules are implemented for static content elements and not for dynamic content elements. In other words, storing rules might be applicable to infrequently modified content elements, whereas storing rules might not be applicable to frequently modified content elements. For example, the background.png image referred to in the URL of the exemplary HTTP request above may be an infrequently modified content element. The document may also contain a second content element that is frequently modified. It is possible that there is no storing rule corresponding to the second content element. Accordingly, at step S418, a determination is made not to store the second content element in the cache 209.

Advantageously, storing content elements in the cache 209 may significantly improve the performance of the client 204, since content elements stored in the cache 209 do not need to be downloaded from the server 202.

At step S422, responses to the HTTP requests referred to in step S404 may be collected by the client 204. The responses may be assembled and rendered as a coherent user interface document, i.e. the user interface 300.

Implementing the method of FIG. 4 may result in all static contents of the user interface 300 being stored in the cache 209. Alternatively, a portion of the static contents may be stored in the cache 209 due to limitations in the storage capacity of the cache 209.

By means of the proxy 206 in the cache 209, processing of content elements on the embedded system 100 can be accelerated. Content elements, e.g. static content elements, can be retrieved more quickly from the cache 209 in comparison to the server 202. Moreover, because proxy 206 is executed separately from the client 204, there is no need to integrate the client 204 with the proxy 206. Also, by distinguishing between static content elements (i.e. infrequently modified content elements) and dynamic content elements (i.e. frequently modified content elements) the limited capacity of the cache 209 can be used in an advantageous way. In addition, by separating the cache 209 from the firmware of the embedded system 100, content elements stored in the cache 209 can be updated without upgrading the firmware.

What is claimed is:

1. A computer-implemented method for increasing the speed of data retrieval by a client on an embedded system the embedded system comprising a storing component, the method comprising:
   executing the client on the embedded system;
   executing an intermediary on the embedded system, wherein the client and the intermediary are executed separately, and wherein the intermediary manages the storing component;
   receiving a first request, from the client at the intermediary, for a first content element of a document;
   determining, by the intermediary, whether the first content element is stored in the storing component;
   responsive to determining the first content element is stored in the storing component,
      retrieving the first content element from the storing component, and
      sending the first content element from the intermediary to the client; and
   responsive to determining the first content element is not stored in the storing component,
      retrieving the first content element from a server,
      determining whether the first content element matches a storing rule, the storing rule including an expiration rule indicating how long the first content element is to be stored in the storing component,
      if the first content element matches the storing rule, storing the first content element in the storing component based on the storing rule and sending the first content element to the client, and
      if the first content element does not match the storing rule, sending the first content element to the client.

2. The method of claim 1, wherein the storing rule includes at least one the following:

an expiration;
a string of a Uniform Resource Locator; and
a content type.

3. The method of claim 1, wherein the embedded system includes a non-volatile memory and wherein a firmware is stored in the non-volatile memory as a binary image.

4. The method claim 3, wherein the storing component is stored separately from the firmware.

5. The method of claim 3, wherein executing the client on the embedded system further comprises copying the firmware from the non-volatile memory to a volatile memory, and wherein copying the firmware to the volatile memory comprises copying the entire contents of the non-volatile memory into the volatile memory.

6. The method of claim 1, wherein the client and the intermediary are executed as separate processes.

7. The method of claim 1, wherein the intermediary is implemented as an external component of the client.

8. The method of claim 1, wherein the first content element is infrequently modified, the method further comprising:
   determining, by the intermediary, to store the first content element in the storing component based on the storing rule; and
   storing the first content element in the storing component.

9. The method of claim 1, wherein the document includes a second content element, wherein the second content element is frequently modified, the method further comprising:
   receiving a second request, from the client at the intermediary, for a second content element of the document;
   retrieving the second content element; and
   determining, by the intermediary, not to store the second content element in the storing component.

10. The method of claim 1, wherein the embedded system is a set-top box connected to the server including software for delivering Internet Protocol Television.

11. The method of claim 1, wherein the client includes a web browser.

12. A non-transitory computer-readable medium comprising computer-readable instructions, which, when loaded and executed by a processor in an embedded system, causes the embedded system to perform operations according to a method of:
   executing a client on the embedded system;
   executing an intermediary on the embedded system, wherein the client and the intermediary are executed separately, and wherein the intermediary manages the storing component;
   receiving a first request, from the client at the intermediary, for a first content element of a document;
   determining, by the intermediary, whether the first content element is stored in the storing component;
   responsive to determining the first content element is stored in the storing component,
      retrieving the first content element from the storing component, and
      sending the first content element from the intermediary to the client; and
   responsive to determining the first content element is not stored in the storing component,
      retrieving the first content element from a server,
      determining whether the first content element matches a storing rule, the storing rule including an expiration rule indicating how long the first content element is to be stored in the storing component,
      if the first content element matches the storing rule, storing the first content element in the storing component based on the storing rule and sending the first content element to the client, and
      if the first content element does not match the storing rule, sending the first content element to the client.

13. An embedded system, comprising:
a client;
a storing component to store data;
a processor; and
an intermediary executed by the processor to:
   manage the storing component;
   receive a first request, from the client, for a first content element of a document;
   determine whether the first content element is in the storing component;
   responsive to determining the first content element is in the storing component,
      retrieve the first content element from the storing component, and
      send the first content element to the client; and
   responsive to determining the first content element is not stored in the storing component,
      retrieve the first content element from a server,
      determine whether the first content element matches a storing rule, the storing rule including an expiration rule indicating how long the first content element is to be stored in the storing component,
      if the first content element matches the storing rule, storing the first content element in the storing component based on the storing rule and sending the first content element to the client, and
      if the first content element does not match the storing rule, sending the first content element to the client;
wherein the client and the intermediary are executed separately.

* * * * *